United States Patent [19]
Mahr et al.

[11] Patent Number: 5,928,707
[45] Date of Patent: Jul. 27, 1999

[54] FOOD PRODUCTS HAVING INTACT GRANULAR SWOLLEN STARCH AND THEIR PREPARATION

[75] Inventors: Birgitt Mahr; Hans Uwe Trueck, both of Stuttgart, Germany

[73] Assignee: Nestec S.A., Vevey, Switzerland

[21] Appl. No.: 08/877,288

[22] Filed: Jun. 17, 1997

[30] Foreign Application Priority Data

Jun. 18, 1996 [EP] European Pat. Off. ............. 96 201694

[51] Int. Cl.⁶ ................................ A23L 1/05; A23D 7/00
[52] U.S. Cl. ......................... 426/661; 426/511; 426/602; 127/71
[58] Field of Search ..................... 426/661, 511, 426/549, 602; 127/71; 252/311, 351

[56] References Cited

U.S. PATENT DOCUMENTS

| | | | |
|---|---|---|---|
| 3,836,680 | 9/1974 | Salza et al. | 426/155 |
| 3,949,104 | 4/1976 | Cheng et al. | 426/578 |
| 3,950,547 | 4/1976 | Lamar, III et al. | 426/74 |
| 4,362,755 | 12/1982 | Mitchell et al. | 426/579 |
| 4,418,090 | 11/1983 | Bohrmann et al. | 426/568 |
| 4,491,483 | 1/1985 | Dudacek et al. | 127/33 |
| 4,508,576 | 4/1985 | Mudde | 127/32 |
| 4,792,362 | 12/1988 | Heidel | 127/71 |
| 4,978,554 | 12/1990 | Larsson et al. | 426/604 |
| 5,100,475 | 3/1992 | Würsch et al. | 127/67 |
| 5,291,877 | 3/1994 | Conde-Petit et al. | 127/33 |
| 5,576,048 | 11/1996 | Hauber et al. | 426/578 |
| 5,676,994 | 10/1997 | Eskins et al. | 426/602 |
| 5,679,395 | 10/1997 | Finocchiaro | 426/582 |
| 5,711,986 | 1/1998 | Chiu et al. | 426/658 |
| 5,755,890 | 5/1998 | Yuan | 127/71 |
| 5,759,581 | 6/1998 | Baensch et al. | 424/489 |

FOREIGN PATENT DOCUMENTS 2674729  10/1992  France.

OTHER PUBLICATIONS

Lonkhuysen, et al., Interaction of Monoglycerides with Starches, Die Starke Jan 26, 1974, pp. 337–342 (1974).

Derwent Information, Ltd., Database Abstract, WPI Accession No. 92–400976/199249 abstract of Brice, et al., French Patent Application Publication No. 2 674 729 (1992).

*Primary Examiner*—Nina Bhat
*Attorney, Agent, or Firm*—Vogt & O'Donnell, LLP

[57] ABSTRACT

A food product is prepared by mixing (i) a native starch having, by weight, an amylose content of from about 10% to 30%, (ii) a lipid emulsifier which complexes amylose and (iii) water to obtain a dispersion, heating the dispersion first at a temperature below a gelatinization temperature of the amylose for a time for complexing the amylose and emulsifier and then at a temperature to gelatinize the starch and obtain a heated dispersion of intact swollen starch granules and the heated dispersion is cooled to obtain a food product having intact swollen starch granules. The native starch is employed in an amount of between 5% and 30% by weight based upon water weight and the emulsifier is employed in an amount of between 5% and 15% by weight based upon amylose content weight. The food product has a complex viscosity at 0.4 Hz of between 200 Pa.s. and 700 Pa.s., and the product may include at least a salt component and other ingredients, these ingredients being mixed with the starch, emulsifier and water before heating or being added to the food product after heating, and these products have a complex viscosity at 0.4 Hz of between 10 Pa.s. and 700 Pa.s.

37 Claims, No Drawings

FOOD PRODUCTS HAVING INTACT GRANULAR SWOLLEN STARCH AND THEIR PREPARATION

BACKGROUND OF THE INVENTION

The present invention relates to food thickener products prepared with starch, to foodstuffs prepared with such food thickener products and to processes for preparing such thickeners and foodstuffs.

It is already known to prepare a product with a creamy and smooth texture in which, modified starches are used, because they allow to obtain a heat and shear stable product. Modified starches are used in sensitive products like salad cream, mayonnaises and comparable products. The aim is to have such starches as a fat replacer. The drawback of such solution is that modified starches are not natural ingredients and they are too expensive, since the consumer more and more desires natural ingredients and less expensive products, a new solution has to be found. Native starches are not stable against heat and shear, so that their use is not possible in such processes. U.S. Pat. No. 5,291,877 deals with the interaction of amylose polymer and emulsifiers wherein formation of an amylose-emulsifier complex is obtained to get a strong gel. The amylose is dissolved from the granule and is then complexed outside the granule with the emulsifier. This reaction strengthens the amylose matrix, and a strong gel is obtained.

SUMMARY OF THE INVENTION

The aim of the present invention is exactly the contrary of the above-mentioned patent, i.e., obtaining a food thickener which is flowable which may be used afterwards in a mixture for the preparation of a creamy and smooth product, e.g., an analogue to a mayonnaise, but with a lower fat content. The product according to the invention has further to be shear and heat stable.

The present invention provides a food thickener having improved shear and storage stability comprising a native amylose starch with an amylose content from about 10 to 30% and a lipid emulsifier being in an aqueous phase, wherein the amylose starch content is comprised between 5 and 30% related to the water and the emulsifier content is comprised between 5 and 15% related to the amylose and having a complex viscosity at 0.4 Hz comprised between 200 and 700 Pa.s.

The present invention provides a creamy native starch based food thickener and foodstuff by reason of using a lipid emulsifier to complex the amylose within the starch granule. Due to the complex formation, the solubility of the amylose is decreased, and no jellied amylose matrix develops. Furthermore, the shear and heat stability of the starch granules are increased, as the amylose is not dissolved and remains within the granule limiting the swelling.

The obtained texture is built up by intact swollen starch granules and is characterised as thick, creamy, smooth, short, not jellied, not slimy and not stringy.

The invention also provides a process for the preparation of the above-mentioned food thickener comprising mixing at least the amylose starch and the emulsifier in an aqueous dispersion, heating the dispersion progressively from a temperature of from 20° C. to a temperature between 70 and 100° C. and then cooling the mixture.

The invention further provides a foodstuff prepared with the above-mentioned food thickener wherein the foodstuff comprises the thickener and at least one other component comprising at least salt. Such foodstuffs are, for example, mayonnaises, dressings and sauces and also tomato-based products, like ketchup, and also are desserts and beverages. The product has a complex viscosity of 0.4 Hz comprised between 10 and 700 Pa.s. This foodstuff is produced by the addition of at least salt (between 1 and 3%) and may include an acid component, preferably acetic acid (between 3 and 5%), and also may include a bulking agent.

DETAILED DESCRIPTION OF THE INVENTION

In the whole of this specification disclosure, including the claims, all percentages are given in weight.

Native starches have an amylose content comprised between 1 and 80%. The starches used according to the invention have an amylose content from about 10 to 30%. The starches used are selected from the group consisting of native maize, wheat, barley, rice, legumes starch, tapioca starch and the corresponding flours.

The emulsifier used must be capable of forming a complex with amylose. Such emulsifiers are monoglycerides, preferably monoglycerides of saturated $C_{12}$–$C_{24}$ fatty acids, polyoxyethylen-sorbitan-esters of fatty acids (tweens), lysolecithins fatty acid acyl lactylates, stearoyl lactylates, sorbitan esters of fatty acids and sucrose esters.

The food thickener according to the invention preferably comprises between 10 and 20% amylose starch related to the water. Trials and calculations showed that the content of the emulsifier is preferably comprised between 9 and 11% related to the amylose.

The emulsifier may be added directly to the starch/water suspension or it may be added in dispersion.

For preparation of the foodstuff in accordance with the present invention, the bulking agent is selected from the group consisting of lactose, maltodextrin, sugar and others. In the case of sugar, the content is comprised between 5 and 15%. In the case of maltodextrin, the content is comprised between 3 and 10% and for the lactose, between 3 and 15%. All these percentages are given based on the final product.

The amylose polymer allows to obtain a fat reduced product. The addition of a certain amount of fat is however possible. For example, between 1 and 50% oil can be present. The oil used is not critical and is selected from the group consisting of soy, sunflower, cotton seed and others.

For reasons of stabilisation, a second emulsifier can be also added, for example egg yolk, whey protein or other emulsifiers, which do not complex amylose.

For further thickening an additional thickening, agent can also be added. This agent is selected from the group consisting of xanthan, guar and locust gum and others.

For enhancing the creamy character of the product, it is also possible to add between 10 and 50% of yoghurt.

It is important for the process to make sure that the starch is gelatinised after the formation of the amylose-emulsifier complex. To ensure this, it is necessary to keep the starch-emulsifier suspension for an adequate time at a temperature below the gelatinisation temperature of the amylose polymer. This gelatinisation temperature is around 70–75° C., depending on the starch used. Suitable holding times are 50° C. or 60° C. for 5, 10, 15 or 20 minutes. This holding time may result automatically in the process, for example in batch processes with heating over 5–15 minutes. In continuous processes, an additional holding temperature step must be added, for example at 50° C. for at least 5 minutes.

Two ways are possible for the preparation of the foodstuff of the invention. Either the food thickener is gelatinised and afterwards mixed with the other components or the foodstuff is produced by an all-in-one heating process where all the ingredients are directly mixed together. The used process depends on the recipe of the foodstuff.

After the holding time and the heating step, the suspension is gelatinised and a stable native starch slurry or a creamy all-in-one product results.

The content in starch is measured according to methods described in "Ausgewählte Methoden der Stärkechemie", Stuttgart.

The obtained texture of the native starch product is defined by microscopical, sensory and rheological methods. Through the microscope, intact swollen starch granules are identified. The resulting smooth, creamy, thick and short texture is characterised with sensory methods. In addition to this information, the texture is further described by rheological parameters. These parameters are the conservation modulus G', which characterises the elasticity of the viscoelastic product, and the dissipation modulus G", which characterises its viscous properties.

The sample is subjected to a sinusoïdal stress as a function of frequency (between 0 and 15 Hz). The corresponding deformation is measured. It is also sinusoidal, but has a phase shift between the extremes of zero (purely elastic texture) and Π/2 (purely viscous texture). Substances with an intermediate phase shift have an elastic component, the conservation modulus G' and a viscous component, the dissipation modulus G". With the same method, the complex viscosity is measured and given at a frequency of 0.4 Hz. The ratio G"/G' gives the phase at 0.4 Hz.

Other rheological parameters are the compliance and recovery compliance when the sample is investigated with constant stress and when the deformation in dependence of time is measured. The determination of the yield stress further characterises the product.

All these moduli are determined with a Bohlin rheometer CS using a cone/plate measuring system. The measurements are carried out at 20° C.

Concerning all these moduli, it can be said that the higher the complex viscosity, the thicker the suspension. For the yield stress, 0 is for water and 100 Pa concerns a flowable product. For G', a high number means an elastic product, which is in accord with the present invention, and the contrary for G". For the phases, a high angle means a product which is less elastic.

EXAMPLES

The following examples are intended to illustrate the product with heavy texture according to the invention and the process for its production.

Example 1

Food thickener according to the invention

| | |
|---|---|
| Native maize starch | 10% |
| Tween 60 | 0.3 |
| Water | 89.7 |
| Total | 100% |

The emulsifier (Tween 60: Polyoxyethylen (20)-sorbitan-monostearat) was dispersed in a beaker beforehand in 10% of the water and was heated to 60° C. Then, the dispersion was cooled to 40° C. and added to the water and the maize starch. The mixture was stirred with 600 U/min while heating to 50° C. in a small batch machine, keeping this temperature for 5 minutes and then it was filled up hot. A thick, not jellied starch slurry was obtained. Through the microscope intact starch granules were recognised.

The obtained starch slurry has following rheological moduli:

| | |
|---|---|
| Yield stress | 19 Pa |
| Complex viscosity at 0.4 Hz | 360 Pa · s |
| Conservation modulus G' at 0.4 Hz | 817 Pa |
| Dissipation modulus G" at 0.4 Hz | 500 Pa |
| Phase at 0.4 Hz | 31° |
| Creep compliance at 20 Pa after 300 s | $3.1.10^{-3}$ Pa$^{-1}$ |
| Creep recovery compliance after 300 s | $1.1.10^{-3}$ Pa$^{-1}$ |

Example 2

Starch slurry for salad cream

| | |
|---|---|
| Native maize starch | 10% |
| Tween 60 | 0.3 |
| Vinegar | 3.9 |
| Salt | 2.4 |
| Sugar | 13.1 |
| Lactose | 8.2 |
| Water | 62.1 |
| Total | 100% |

The emulsifier (Tween 60: Polyoxyethylen (20)-sorbitan-monostearat) was dispersed in a beaker beforehand in 10% of the water and was heated to 60° C. Then, the dispersion was cooled to 40° C. and added to the other components of the mixture. The mixture was stirred with 600 U/min while heating to 50° C. in a small batch machine, keeping this temperature for 5 minutes and then it was filled up hot. A thick, not jellied starch slurry was obtained. Through the microscope intact starch granules were recognised.

The obtained starch slurry has following rheological moduli:

| | |
|---|---|
| Yield stress | 24 Pa |
| Complex viscosity at 0.4 Hz | 400 Pa · s |
| Conservation modulus G' at 0.4 Hz | 900 Pa |
| Dissipation modulus G" at 0.4 Hz | 440 Pa |
| Phase at 0.4 Hz | 26° |
| Creep compliance at 20 Pa after 300 s | $2.5.10^{-3}$ |
| Creep recovery compliance after 300 s | $1.3.10^{-3}$ |

Example 3

With the starch slurry from Example 2, a salad cream with 50% fat was produced.

| | |
|---|---|
| Native maize starch | 3% |
| Tween 60 | 0.09 |
| Vinegar | 3.2 |
| Salt | 1.9 |
| Sugar | 6.2 |
| Lactose | 3 |
| Mustard | 3 |
| Modified egg yolk | 1.5 |
| Soya oil | 50 |
| Water | 28.11 |
| Total | 100% |

The starch slurry from Example 2 was cold mixed in a beaker with a high fat emulsion. A thick mayonnaise with the following rheological moduli was obtained:

| | |
|---|---|
| Yield stress | 18 Pa |
| Complex viscosity at 0.4 Hz | 212 Pa · s |
| Conservation modulus G' at 0.4 Hz | 519 Pa |
| Dissipation modulus G" at 0.4 Hz | 116 Pa |
| Phase at 0.4 Hz | 13° |
| Creep compliance at 20 Pa after 300 s | 11 $10^{-3}$ $Pa^{-1}$ |
| Creep recovery compliance after 300 s | 7.7 $10^{-3}$ $Pa^{-1}$ |

Example 4

A low fat mayonnaise with following composition was produced:

| | |
|---|---|
| Native maize starch | 10% |
| Monoglycerides | 0.3 |
| Vinegar | 4.45 |
| Salt | 1.5 |
| Sugar | 7.25 |
| Lactose | 3 |
| Maltodextrin | 6.7 |
| Whey protein | 0.25 |
| Water | 56.55 |
| Soya oil | 10 |
| Total | 100% |

All ingredients except for the monoglycerides were mixed and emulsified. The monoglycerides were dispersed in water in a beaker and then added to the emulsion. The emulsion was heated under stirring with 1500 U/min in a 2 kg Stephan machine to 85° C. and held 5 minutes at this temperature. Then, it was filled up hot. Through the microscope, intact maize starch granules were recognised. The product has a creamy mayonnaise-like texture with the following rheological parameters:

| | |
|---|---|
| Yield stress | 10 Pa |
| Complex viscosity at 0.4 Hz | 80 Pa · s |
| Conservation modulus G' at 0.4 Hz | 112 Pa |
| Dissipation modulus G" at 0.4 Hz | 170 Pa |
| Phase at 0.4 Hz | 56° |
| Creep compliance at 20 Pa after 300 s | 2 $10^{-3}$ $Pa^{-1}$ |
| Creep recovery compliance after 300 s | 0.7 $10^{-3}$ $Pa^{-1}$ |

Example 5

A 10% fat mayonnaise with yoghurt with following composition was produced:

| | |
|---|---|
| Native maize starch | 7.5% |
| Tween 60 | 0.225 |
| Vinegar | 4.45 |
| Salt | 1.5 |
| Sugar | 7.25 |
| Lactose | 3 |
| Maltodextrin | 3.5 |
| Whey protein | 0.25 |
| Yoghurt | 24.45 |
| Water | 37.875 |
| Soya oil | 10 |
| Total | 100% |

All ingredients except for Tween 60 were mixed and emulsified. The Tween 60 is dispersed in water and then added to the emulsion. The emulsion was heated under stirring with 1500 U/min in a 2 kg Stephan machine to 85° C. and held 5 minutes at this temperature. Then, it was filled up hot.

Through the microscope, intact maize starch granules were recognised. The product has a creamy mayonnaise-like texture with the following rheological parameters:

| | |
|---|---|
| Yield stress | 20 Pa |
| Complex viscosity at 0.4 Hz | 299 Pa · s |
| Conservation modulus G' at 0.4 Hz | 622 Pa |
| Dissipation modulus G" at 0.4 Hz | 324 Pa |
| Phase at 0.4 Hz | 21° |
| Creep compliance at 20 Pa after 300 s | 1.4 $10^{-3}$ $Pa^{-1}$ |
| Creep recovery compliance after 300 s | 0.9 $10^{-3}$ $Pa^{-1}$ |

Example 6

A ketchup with the following composition was produced:

| | |
|---|---|
| Native maize starch | 5% |
| Tween 60 | 0.15 |
| Vinegar | 8 |
| Salt | 2.3 |
| Sugar | 4.7 |
| Tomato-pulp | 19.5 |
| Spices | 0.2 |
| Water | 60.15 |
| Total | 100% |

All ingredients were mixed in a Stephan machine and were heated to 50° C. This temperature was kept for 10 minutes. Then the mixture was heated to 90° C., kept 5 minutes at this temperature and then it was filled hot. A typical ketchup texture was obtained.

The ketchup had the following rheological moduli:

| | |
|---|---|
| Yield stress | 11 Pa |
| Complex viscosity at 0.4 Hz | 215 Pas |
| Conservation modulus G' at 0.4 Hz | 523 Pa |
| Dissipation modulus G" at 0.4 Hz | 132 Pa |
| Phase at 0.4 Hz | 14° |

Example 7

A salad mayonnaise was produced with native maize flour. For that the following starch slurry was produced.

Starch slurry:

| | |
|---|---|
| Native maize starch | 16.7% |
| Tween 60 | 0.4 |
| Vinegar | 1.9 |
| Salt | 2.4 |
| Sugar | 13.1 |
| Lactose | 8.2 |
| Water | 57.3 |
| Total | 100% |

All ingredients were mixed and heated to 50° C. in a Stephan machine, keeping this temperature for 10 minutes. Then the slurry was heated indirectly to 85° C., keeping this temperature for 5 minutes. The slurry was cooled to 25° C. and then mixed with the following high fat mayonnaise.

High fat mayonnaise:

| | |
|---|---|
| Water | 6.58% |
| Vinegar | 3.91 |
| Mustard | 4.64 |
| Sugar | 2.34 |
| Salt | 1.56 |
| Spices | 0.12 |
| Citric acid | 0.39 |
| Modified egg yolk | 2.34 |
| Oil | 78.12 |
| Total | 100% |

The premix for the high fat mayonnaise was produced in an agitated vessel. The mayonnaise was then produced in a colloid mill at a speed of 3000 l/min. A very viscous mayonnaise was obtained and was mixed with the described starch slurry. The portion of the starch slurry is 36%. By mixing the high fat mayonnaise with the starch slurry a creamy salad mayonnaise with 50% fat was obtained. This mayonnaise was characterised by the following rheological data:

| | |
|---|---|
| Yield stress | 38 Pa |
| Complex viscosity at 0.4 Hz | 283 Pas |
| Conservation modulus G' at 0.4 Hz | 692 Pa |
| Dissipation modulus G" at 0.4 Hz | 161 Pa |
| Phase at 0.4 Hz | 13° |
| Creep compliance at 20 Pa after 300s | $8.10^{-3}$ Pa$^{-1}$ |
| Creep recovery compliance after 300s | $7.5\ 10^{-3}$ Pa$^{-1}$ |

We claim:

1. A process for preparing a food product comprising:
   mixing ingredients comprising (i) a native starch having, by weight, an amylose content of from about 10% to 30%, (ii) a lipid emulsifier which complexes amylose and (iii) water to obtain a dispersion, wherein the starch mixed is in an amount of between 5% and 30% by weight based upon the water weight and wherein the emulsifier mixed is in an amount of between 5% and 15% by weight based upon amylose content weight;
   heating the dispersion progressively first from a temperature of 20° C. and to a temperature below a gelatinisation temperature of the amylose for a time for complexing the amylose and emulsifier and then to a temperature between 70° C. and 100° C. for a time to gelatinize the starch and obtain a heated dispersion and so that the heated dispersion comprises intact swollen starch granules; and
   cooling the heated dispersion to obtain a food product comprising the intact swollen starch granules.

2. A process according to claim 1 wherein the dispersion is heated to and held at the temperature below the gelatinization temperature for from 5 minutes to 20 minutes.

3. A process according to claim 2 wherein the temperature the dispersion is heated to and held at is a temperature of from 50° C. to 60° C.

4. A process according to claim 1 wherein the dispersion is heated to and held at a temperature of 50° C. for at least 5 minutes for complexing the amylose and emulsifier.

5. A process according to claim 1 wherein the dispersion is heated at a temperature of 85° C. for 5 minutes to gelatinize the starch.

6. A process according to claim 1 wherein the starch is selected from the group consisting of native maize, wheat, barley, rice, legume and tapioca starch.

7. A process according to claim 1 wherein the emulsifier is selected from the group consisting of monoglycerides of saturated $C_{12}$–$C_{24}$ fatty acids, lysolecithins, fatty acid acyl lactylates, sorbitan fatty acid esters, polyoxyethylen-sorbitan fatty acid esters and sucrose esters.

8. A process according to claim 1 wherein the starch is in an amount of between 10% and 20% and wherein the emulsifier is in an amount of between 9% and 11%.

9. A process according to claim 1 wherein the ingredients mixed further comprise salt.

10. A process according to claim 9 wherein the ingredients mixed further comprise an acid.

11. A process according to claim 10 wherein the acid is acetic acid.

12. A process according to claim 9 wherein the ingredients mixed further comprise a bulking agent.

13. A process according to claim 12 wherein the bulking agent is selected from the group consisting of a sugar and maltodextrin.

14. A process according to claim 9 wherein the ingredients mixed further comprise at least one of an oil and of a yoghurt and wherein, by weight based upon the food product weight, when the ingredients mixed comprise an oil, the oil is in an amount, of between 1% and 50% and when ingredients mixed comprise a yoghurt, the yoghurt is in an amount, of between 10% and 50%.

15. A process according to claim 9 wherein the ingredients mixed further comprise a second emulsifier wherein the second emulsifier does not complex amylose.

16. A process according to claim 15 wherein the second emulsifier is selected from the group consisting of egg yolk and whey protein.

17. A process according to claim 9 or 15 wherein the ingredients mixed further comprise a gum.

18. A process according to claim 17 wherein the gum is selected from the group consisting of xanthan gum, locust gum and guar gum.

19. A process according to claim 1 further comprising adding to the food product salt and at least one other ingredient selected from the group consisting of an acid, a bulking agent, a gum, a second emulsifier which does not complex amylose, an oil and a yoghurt to obtain a second food product.

20. The food product of the process of claim 1.

21. The food product of claim 20 wherein the food product has a complex viscosity at 0.4 Hz of between 200 Pa.s. and 700 Pa.s.

22. The food thickener product of the process of claim 7.

23. The food product of the process of claim 9.

24. The food product of claim 23 wherein the food product has a complex viscosity at 0.4 Hz of between 10 Pa.s. and 700 Pa.s.

25. The food product of the process of claim 14.

26. A food product comprising a dispersion in water of (i) a granular swollen native starch and (ii) a lipid emulsifier complexed with amylose of the starch wherein the starch, by weight, has an amylose content of from about 10% to 30%, wherein the starch is in an amount of between 5% and 30% by weight based upon water weight and wherein the emulsifier is in an amount of between 5% and 15% by weight based upon amylose content weight and wherein the product has a complex viscosity at 0.4 Hz of between 200 Pa.s. and 700 Pa.s.

27. A food product comprising a dispersion in water of (i) a granular swollen native starch and (ii) a lipid emulsifier complexed with amylose of the starch and components of salt wherein the starch, by weight, has an amylose content of from about 10% to 30%, wherein the starch is in an amount of between 5% and 30% by weight based upon water weight and wherein the emulsifier is in an amount of between 5% and 15% by weight based upon amylose content weight and wherein the product has a complex viscosity at 0.4 Hz of between 10 Pa.s. and 700 Pa.s.

28. A food product according to claim 26 or 27 wherein the starch is selected from the group consisting of native maize, wheat, barley, rice, legume and tapioca starch.

29. A food product according to claim 26 or 27 wherein the emulsifier is selected from the group consisting of monoglycerides of saturated $C_{12}$–$C_{24}$ fatty acids, lysolecithins, fatty acid acyl lactylates, sorbitan fatty acid esters, polyoxyethylen-sorbitan fatty acid esters and sucrose esters.

30. A food product according to claim 26 or 27 wherein the starch is in an amount of between 10% and 20%.

31. A process according to claim 26 or 27 wherein the emulsifier is in an amount of between 9% and 11%.

32. A food product according to claim 27 further comprising an acid component.

33. A food product according to claim 32 wherein the acid component is acetic acid.

34. A food product according to claim 27 further comprising a bulking agent selected from the group consisting of lactose, maltodextrin and sugar.

35. A food product according to claim 27 further comprising at least one of an oil and a yoghurt, wherein when the oil is present, the oil is present in an amount, by weight, of between 1% and 50% and when the yoghurt is present, the yoghurt is present in an amount, by weight, of between 10% and 50%.

36. A food product according to claim 27 further comprising a gum component.

37. A food product according to claim 27 wherein the gum component is selected from the group consisting of xanthan gum, locust gum and guar gum.

* * * * *

UNITED STATES PATENT AND TRADEMARK OFFICE
CERTIFICATE OF CORRECTION

PATENT NO.   : 5,928,707
DATED        : July 27, 1999
INVENTOR(S)  : Brigitt MAHR, et al.

It is certified that error appears in the above-identified patent and that said Letters Patent is hereby corrected as shown below:

Column 8, line 64, (line 3 of claim 27) after "and", insert -- (iii) --.

Column 9, line 16 (line 1 of claim 31) delete "process" and insert therefor -- food product --.

Signed and Sealed this

Eleventh Day of January, 2000

Attest:

Attesting Officer

Q. TODD DICKINSON

Acting Commissioner of Patents and Trademarks